US006886526B2

(12) United States Patent
Bishop

(10) Patent No.: US 6,886,526 B2
(45) Date of Patent: May 3, 2005

(54) AIR DELIVERY APPARATUS FOR AN INTERNAL COMBUSTION ENGINE

(75) Inventor: Gordon Bishop, Rochester Hills, MI (US)

(73) Assignee: Superior Air Flow Technologies, Inc., Sterling Heights, MI (US)

(*) Notice: Subject to any disclaimer, the term of this patent is extended or adjusted under 35 U.S.C. 154(b) by 0 days.

(21) Appl. No.: 10/742,050

(22) Filed: Dec. 19, 2003

(65) Prior Publication Data

US 2004/0134461 A1 Jul. 15, 2004

Related U.S. Application Data

(60) Provisional application No. 60/435,063, filed on Dec. 19, 2002.

(51) Int. Cl.[7] .......................... F02B 77/00; F02M 35/10
(52) U.S. Cl. ............................. 123/198 E; 123/184.21; 123/184.46; 261/18.23; 261/DIG. 19
(58) Field of Search ......................... 123/559.1, 306, 123/308, 184.21, 184.46, 184.32, 198 E, 590, 591, 592, 593; 261/18.23, DIG. 19

(56) References Cited

U.S. PATENT DOCUMENTS

| | | | | |
|---|---|---|---|---|
| 1,305,174 A | * | 5/1919 | Smith ........................... | 123/590 |
| 2,966,150 A | * | 12/1960 | Wiltshire et al. ........ | 123/184.46 |
| 2,990,822 A | * | 7/1961 | Cramer ....................... | 261/23.2 |
| 3,975,466 A | * | 8/1976 | Bradshaw .................. | 261/23.2 |
| 5,915,354 A | * | 6/1999 | Ma ............................ | 123/308 |
| 6,371,068 B2 | * | 4/2002 | Taylor ..................... | 123/184.21 |
| 6,668,783 B2 | * | 12/2003 | Taylor ...................... | 123/193.5 |

FOREIGN PATENT DOCUMENTS

DE          3711859 A1 * 10/1987 ................. 123/306

OTHER PUBLICATIONS

Superior Airflow Technologies: The 4500 Series Extreme Velocity Intake System Sep. 19, 2003; and the 4150 Series Extreme Velocity Intake System Apr. 16, 2003.*
Printout for 80 Ford Mustang 392ci from www.superiorairflow.com website.
Printout for 87 Mustang 359ci from www.superiorairflow.com website.
Printout for 97 Dodge SS/T 440ci from www.superiorairflow.com website.

* cited by examiner

*Primary Examiner*—Thai-Ba Trieu
(74) *Attorney, Agent, or Firm*—Gifford, Krass, Groh, Sprinkle, Anderson, & Citkowski, P.C.

(57) ABSTRACT

An air delivery device for use in delivering air from the outlet of a turbocharger to a carburetor. The device has an intake passage extending from an inlet through an appended portion extending to an outlet. A flow divider extends diametrically through the passage from the inlet to the outlet. The flow divider provides passage into an upper channel and a lower channel. The upper channel delivers air to the front barrels of a four-barrel carburetor and the upper channel delivers air to the rear barrels of a four-barrel carburetor. The intake passage has a frustoconical shape which increases in diameter from the inlet to the bend portion.

10 Claims, 3 Drawing Sheets

US 6,886,526 B2

AIR DELIVERY APPARATUS FOR AN INTERNAL COMBUSTION ENGINE

RELATED APPLICATION

This application claims priority of U.S. Provisional Patent Application Ser. No. 60/435,063 filed Dec. 19, 2002, which is incorporated herein by reference.

FIELD OF THE INVENTION

The invention relates to an air delivery device for an internal combustion engine and more specifically to an air delivery device extending between a compressor and a carburetor for increasing the performance of an internal combustion engine.

BACKGROUND OF THE INVENTION

In order to extract more power from an engine, it is necessary to burn more fuel. When a given quantity of fuel is burned, an exact amount of oxygen is required if the mixture is to be burned without leaving any excess fuel or oxygen. Most internal combustion engines have to operate at or near this mixture at full load. In order to burn more fuel, it is necessary to somehow get more air into the combustion chambers. Superchargers and turbochargers are used to act as an air pump and as a compressor compressing the air at the engine intake. A bonnet having an inlet connected to a turbocharger or supercharger is used to deliver a flow of air to the intake manifold or carburetion system of the vehicle. The bonnet has a passage which turns from a generally horizontal alignment downwardly approximately 90 degrees to deliver the air to the inlet of carburetor. It would be advantageous to provide an air intake device or bonnet which has minimum drag and high-efficiency delivery of compressed air from a turbocharger or supercharger to the carburetor.

SUMMARY OF THE INVENTION

These and other advantages are provided by an air delivery device having a housing having an elongated intake portion and a bend passage portion. A flow divider extends through the housing to divide the passage into two channels. The flow divider is a wall which extends along the diameter from an inlet through the bend passage portion to the outlet. The intake passage increases in diameter at a consistent rate to the bend passage portion. One channel delivers air to one pair of barrels of a four-barrel carburetor and the other channel delivers air to the other pair of barrels. Additionally, compression plates may be provided having contoured surfaces which direct the air from the extremities of the channels into each of the barrels of the carburetor.

BRIEF DESCRIPTION OF THE DRAWINGS

The invention will now be illustrated with respect to the following drawings illustrating embodiments of the invention in which.

DETAILED DESCRIPTION OF THE

Preferred Embodiments of the Invention

Figure 1:
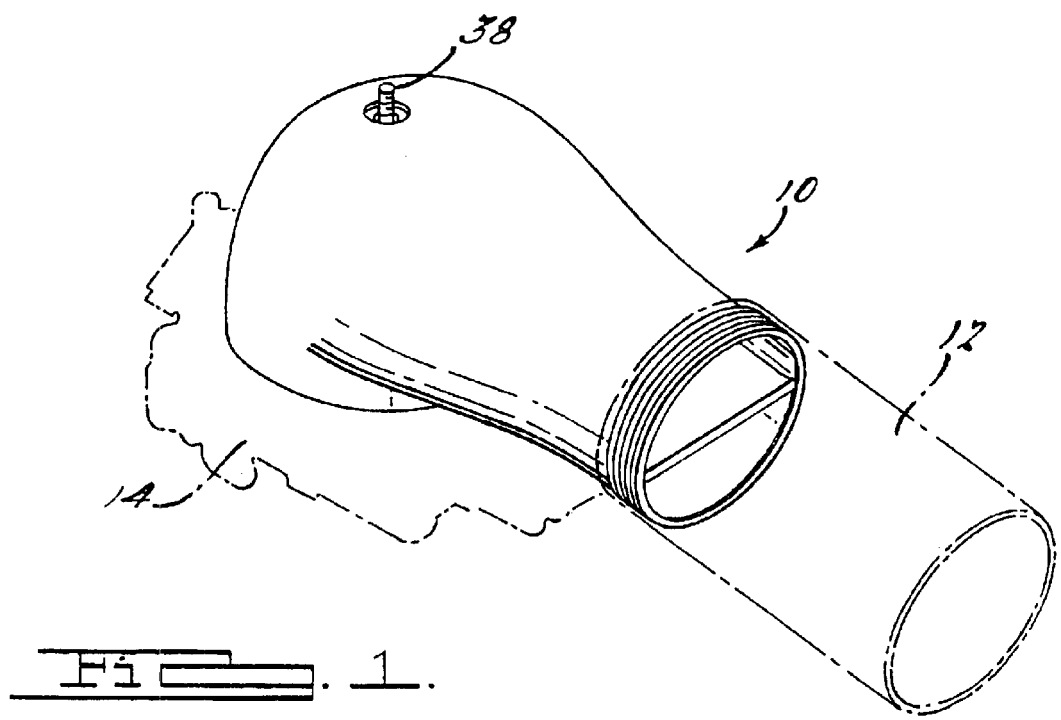
FIG. 1 is a perspective view of the air delivery device in accordance with the invention.

Referring to FIG. 1, there is illustrated an air delivery device 10 or plenum for use with the air intake system which extends between an outlet 12 of a turbocharger and a carburetor. In the preferred embodiment, the air delivery device 10 is a bonnet for use with a four-barrel carburetor 14. Although shown for use with a turbocharger, the intake device may be adapted for use with an air compressor such as a supercharger.

Figure 2:
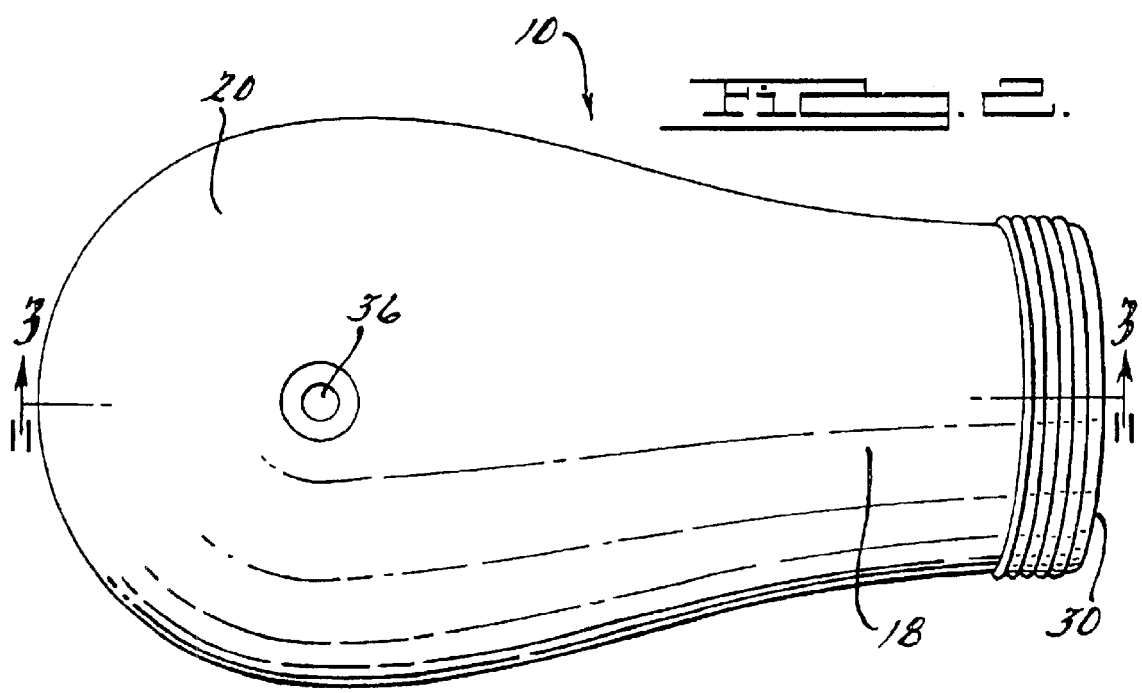
FIG. 2 is a top view of the air delivery device.
Figure 3:
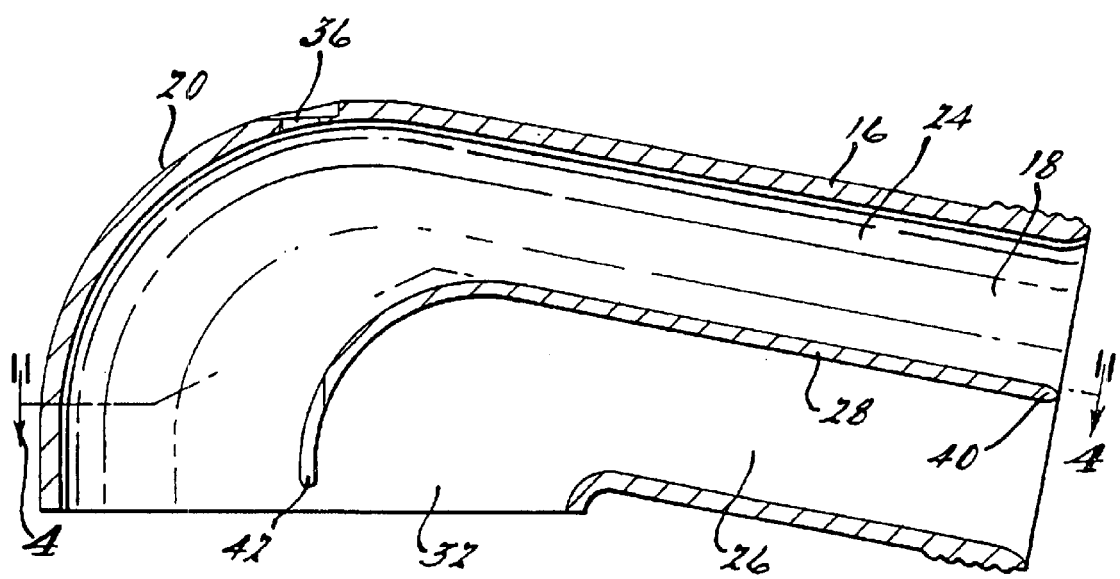
FIG. 3 is a cross-sectional view of a side of the air delivery device taken along line 3—3 of FIG. 2.

As shown in FIGS. 1, 2 and 3, the air delivery device 10 has a rigid housing 16 having a generally horizontally aligned intake portion 18 and a bend portion 20. The housing defines a flow passage 22 which is divided into an upper channel 24 and lower channel 26 by a flow divider 28. The intake portion 18 extends from an inlet 30 to the bend portion 20 and has an elongated frustoconical shape which expands outwardly from the inlet 30 to the bend portion 20. The inlet 30 of the air delivery device is approximately 3½ inches and expands at an angle of approximately 15 degrees to a diameter of approximately 5 inches at the bend portion 20 over a length of approximately 8 inches. The increasing diameter of the passage 22 decreases the airflow through the passage 22 but increases the volume of air so that there will be an increase in the flow through the barrels of the carburetor. In some circumstances it may be advantageous to align the intake portion 18 at an angle below horizontal such as approximately 10 degrees as shown in FIG. 3 to provide better clearance under the hood of the vehicle. The bend portion 20 curves from the intake portion 18 to an outlet 32. The outlet 32 is circular and has a diameter the same or slightly larger than the intake opening of the carburetor 14. The bend portion 20 has a radius of 5 inches and curves through at least 90 degrees so that the outlet 32 is horizontally aligned.

Figure 4:
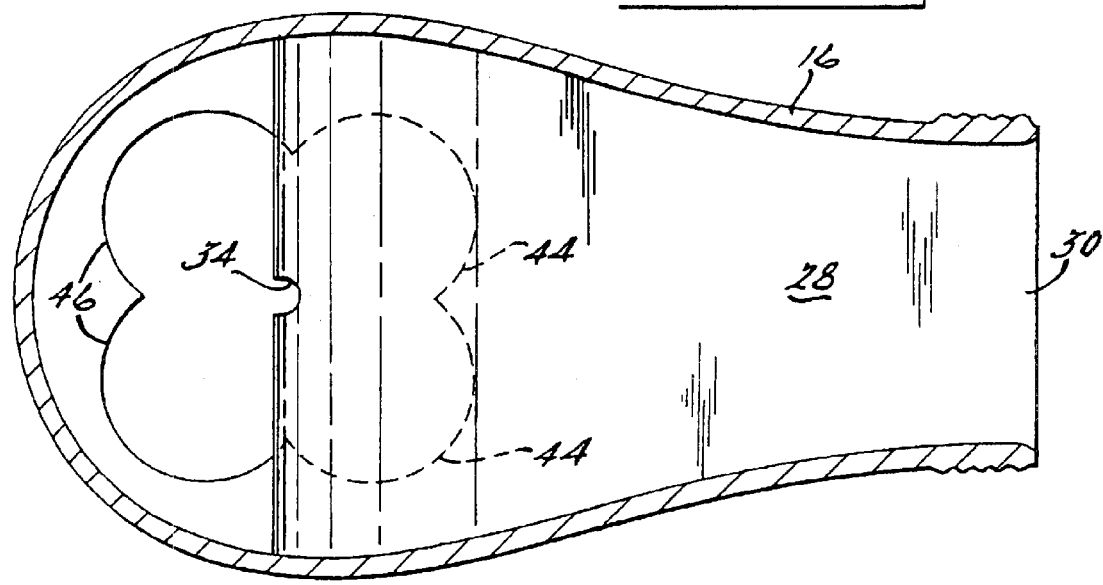
FIG. 4 is a cross-sectional view of an air delivery device rotated 90 degrees from FIG. 3.

As shown in FIGS. 3 and 4, the flow divider 28 extends axially through the passage 22 from the inlet 30 to the outlet 32. The flow divider 28 is a wall which is formed to extend diametrically across the passage 22 and extends generally horizontally through the intake portion 18 of the passage 22 to divide the passage 22 into the upper channel 24 and lower channel 26. The flow divider 28 curves through the bend portion 20 with the same center of curvature as does the bend portion 20. A vertically aligned bore 34 is formed through the bend portion of the flow divider 28 and an aperture 36 through the housing to permit attachment to a threaded rod 38 (FIG. 2) which extends from the carburetor 14 for mounting the air intake device 10 to the carburetor 14.

The flow divider 28 has a V-shaped edge 40 at the inlet 30 to smoothly divert the flow of air into the upper and lower channels. An opposite end 42 of the flow divider 28 at the outlet 32 may be tapered to either a point or to the thickness of the plate which is typically provided to divide the pairs of barrels of the carburetor 14. The flow divider 28 divides the airflow into the two channels and evenly distributes airflow to all four barrels of the carburetor.

As shown in FIG. 1, the lower channel 26 is connected to deliver a volume of air to a pair of front barrels 44 of the carburetor 12 and the upper channel 24 delivers air to a pair of rear barrels 46 of the carburetor. The housing is cast or molded from aluminum or plastic so that the passage increases its diameter continuously and smoothly through out from inlet to outlet and is provided with a smoothly radiused passageway thus providing a smooth contour throughout the passage to minimize disturbance of the air passing through and to provide a greater velocity of airflow from the turbocharger.

Figure 5:
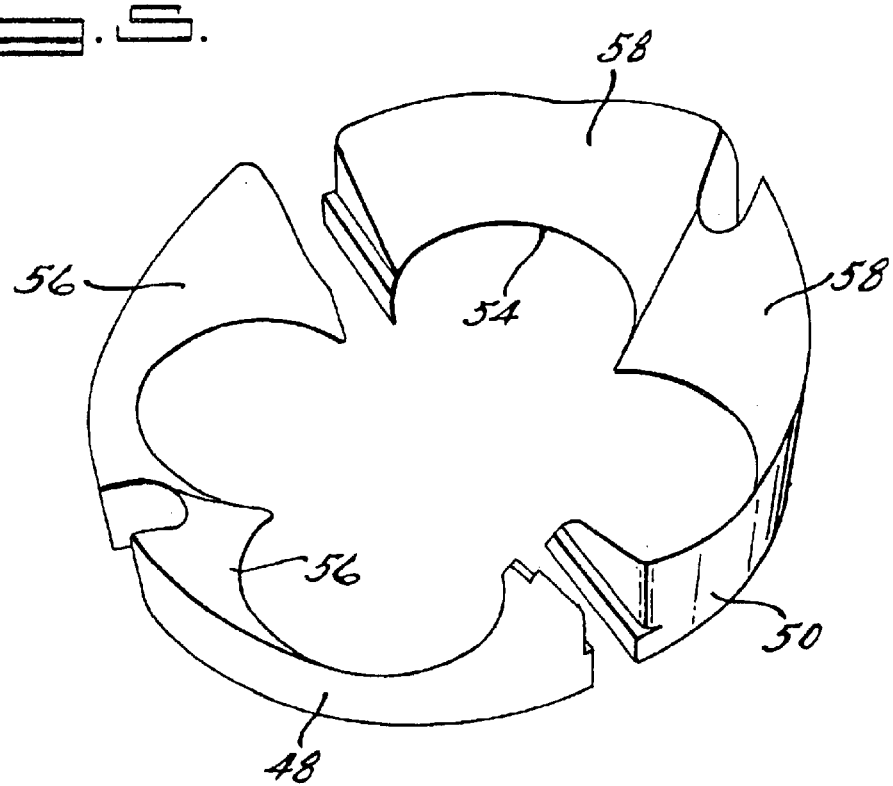
FIG. 5 is a perspective view of compression plates in accordance with the invention.
Figure 6:
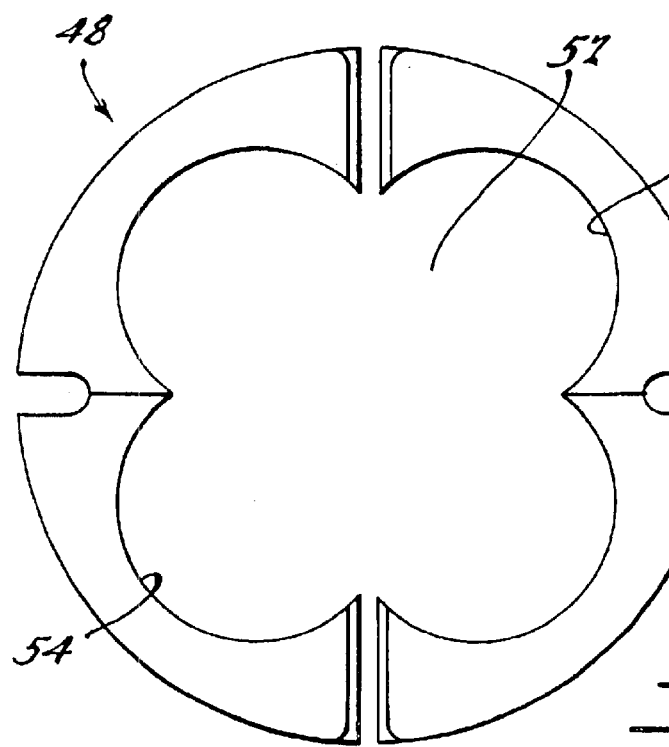
FIG. 6 is a top view of the compression plates in accordance with the invention.

As seen in FIGS. 5 and 6, an optional pair of compression plates 48, 50 can be installed in the outlet 32 to smoothly direct the airflow into each of the barrels of the carburetor 14. The plates 48, 50 have a flat lower surface 52. The plates 48, 50 are semicircular having an outer edge complementary with the inner diameter of the housing 16 at the outlet 32 so as to fit into each of the channels when put together. As shown in FIGS. 5 and 6, the plates together define a cloverleaf opening. Each plate 48, 50 has two semicircular edges 54 which conform to the shape of the barrels of the carburetor 14. Extending outwardly from each of the edges 50 is a contoured surface 56, 58. The contoured surfaces 56, 58 have a radius of curvature generally equal to the radius of the outlet 32 to smoothly direct the flow into the associated barrel of the carburetor. Because of the difference in the dimensions of the bend portion 20 in the lower channel 26 and in the upper channel 28, the front plate 48 has a much smaller contoured surface 56 than the contoured rear plate surfaces 58.

Having thus disclosed the invention for use with a turbocharger and a carburetor, it will be realized that any changes may be made to the invention without departing from the scope of the invention. It is intended that all material contained herein be interpreted as illustrative of the invention and not in a limiting sense.

I claim:

1. An air delivery device for delivery of air from a compression device to a carburetor, said air delivery device comprising:

a housing having a passage extending between an inlet and an outlet, said housing having a bend portion and an intake portion, said intake portion increasing in diameter from said inlet to said bend portion;

said outlet end adapted to mount to the carburetor to said internal combustion engine;

said passage having a circular cross-section extending between said inlet and said outlet end, said body having a flow divider extending diametrically across said passage from said inlet to said outlet.

2. The air delivery device of claim 1 wherein said intake portion increases in diameter at a consistent rate.

3. The air delivery device of claim 1 further comprising a pair of compression plates mounted in respective channels of said housing adjacent to said outlet.

4. An air delivery device for delivery of air from a compression device to a carburetor, said air delivery device comprising:

a housing having a passage extending between an inlet and an outlet, said inlet connected to the flow compression device, said housing having an intake portion and a bend portion, said bend portion extending between said intake portion to said outlet;

said outlet end adapted to mount to the carburetor to said internal combustion engine;

said passage having a circular cross-section extending between said inlet and said outlet end, said body having a flow divider extending diametrically on a plane across said passage from said inlet to said outlet.

5. The air delivery device of claim 4 wherein said intake portion increases in diameter from the inlet to the bend portion.

6. The air delivery device of claim 5 wherein said intake portion increases in diameter at a consistent rate.

7. The air delivery device of claim 4 further comprising a pair of compression plates mounted in respective channels of said housing adjacent to said outlet.

8. An air delivery device for delivery of air from a compression device to a carburetor, said air delivery device comprising:

a housing having a passage extending between an inlet and an outlet;

said outlet end adapted to mount to the carburetor to said internal combustion engine;

said passage having a circular cross-section extending between said inlet and said outlet end, said body having a flow divider extending diametrically across said passage from said inlet to said outlet; and a pair of compression plates mounted in respective channels of said housing adjacent said outlet.

9. The air delivery device of claim 8 wherein each of said pair of plates further comprises an edge defining an opening corresponding to a shape of an opening of a pair of barrels of the carburetor.

10. The air delivery device of claim 8 wherein each of said plates has a pair of contoured surfaces.

* * * * *